Dec. 29, 1953 E. F. GREINER 2,663,898
MACHINE FOR DEVEINING SHRIMPS
Filed Dec. 11, 1952 2 Sheets-Sheet 1
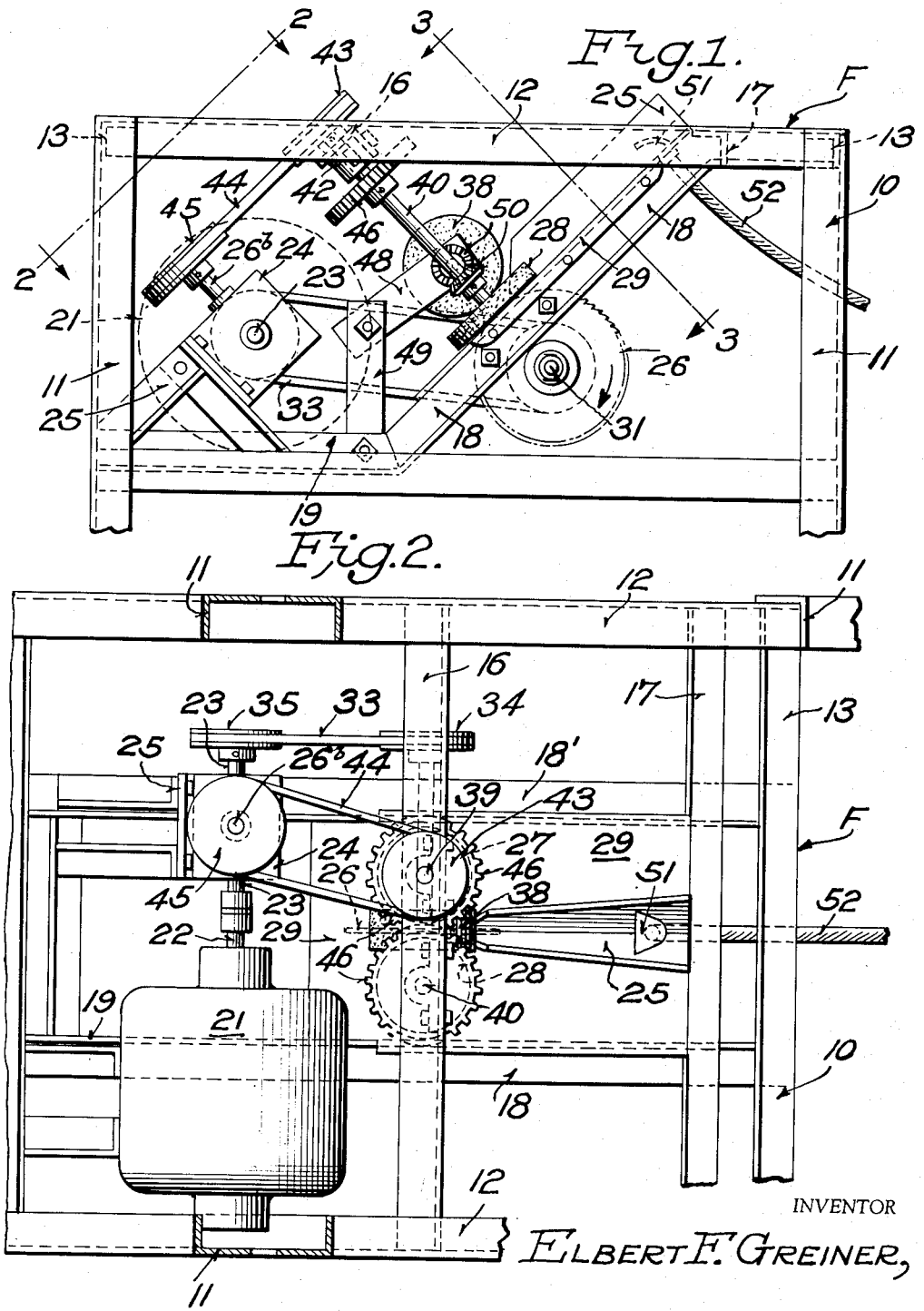
INVENTOR
Elbert F. Greiner,
BY H.B.Wellson&Co.
ATTORNEY

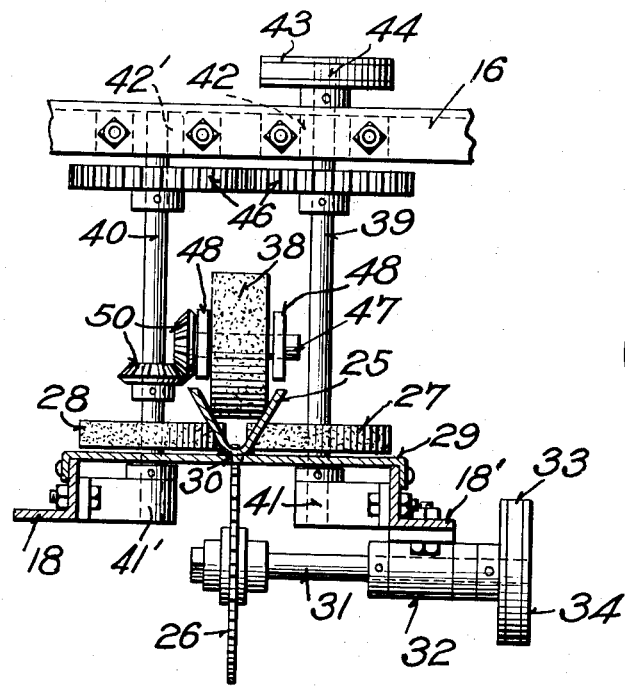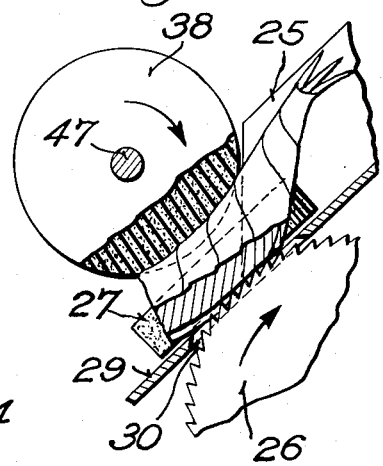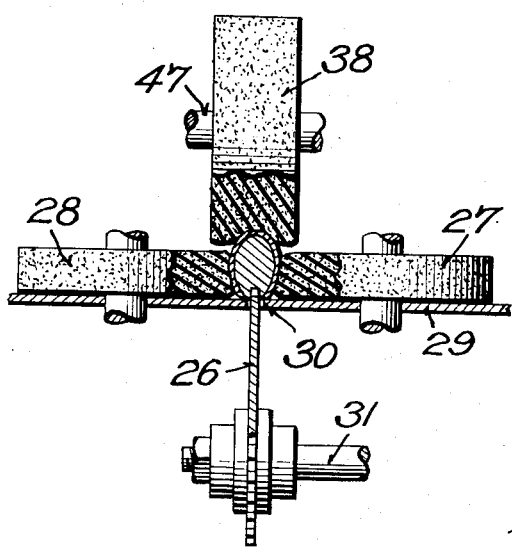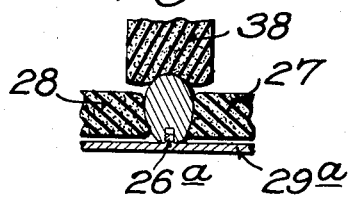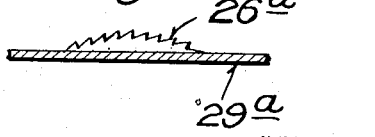

Patented Dec. 29, 1953

2,663,898

UNITED STATES PATENT OFFICE 2,663,898

MACHINE FOR DEVEINING SHRIMPS

Elbert F. Greiner, New Orleans, La.

Application December 11, 1952, Serial No. 325,341

8 Claims. (Cl. 17—2)

This invention relates to machines for making cuts along the backs of shrimps for removal of the sand veins, these machines being commonly called shrimp deveining machines. In such prior machines various means have been proposed for gripping the deheaded body of the shrimp and moving its back with respect to a rotary saw which cuts a groove through the shell and into the body meat to a depth necessary to remove the vein.

The principal object of this invention is to provide an improved means for centering and conveying the shrimp across the cutting device which may be a stationary blade, a rotary blade or disk, or a circular saw.

Another object of the invention is to provide an improved shrimp gripping and moving means which will handle all sizes of shrimps without any adjustment of the parts.

Another object is a machine which will devein peeled shrimps as well as shell-on shrimps without the need of adjusting any of the parts.

With the above and other objects and advantages in view, the invention resides in the novel combinations and arrangements of parts and the novel features of construction hereinafter described and claimed, and illustrated in the accompanying drawings which show the present preferred embodiment of the invention.

In the drawings:

Fig. 1 is a side view of the machine with parts broken away and the motor omitted but its position indicated by dotted lines;

Fig. 2 is a sectional view taken on the line 2—2 in Fig. 1;

Fig. 3 is a detail view on an enlarged scale partly in section taken on the line 3—3 in Fig. 1;

Fig. 4 is an enlarged detail view partly in section showing how a shell-on shrimp is centered and gripped;

Fig. 5 is a detail sectional view of a portion of the showing in Fig. 4, the plane of the section being at right angles to that of Fig. 4;

Fig. 6 is a fragmentary sectional view similar to Fig. 4 but showing a peeled shrimp and a stationary cutter blade; and Fig. 7 is a detail view of the stationary cutter.

Referring more in detail to the drawings the numeral 10 denotes a suitable supporting frame or stand which is of rectangular shape and made from angle metal bars. It is preferably about 37" high, 23" wide and 27" long. It includes four corner posts or legs 11 connected at their tops by side bars 12 and end bars 13. Similar side and end bars connect the legs 11 at points spaced below the top bars to provide a rigid open frame within which the operative parts are disposed. Extending across the top of the frame between the bars 12 are two angle metal cross bars 16 and 17, the latter being adjacent the front or feed end F of the frame. The other angle bar 16 is spaced from the end bar 13 at the rear of the frame and is set with its angle up and its two flanges disposed at 45° angles to the flat top of the frame or stand as seen in Fig. 1. Within the frame are two horizontally spaced and longitudinally disposed angle bars 18, 18' set at a 45° angle to the top and at about the middle of the frame. These spaced bars 18, 18' extend downwardly and rearwardly from the cross bar 17 but their upper portions are extended horizontally through the depending flange of the bar 17 and are connected to the front end bar 13. The lower ends of the inclined bars 18, 18' have horizontal extensions 19 which are fastened to suitable upright bars at the rear end of the frame. On some of these upright bars is mounted a ¼ hp. electric motor 21 having 1750 R. P. M. The shaft 22 of the motor is coupled to the input shaft 23 of an 18 to 1 speed reducer 24. The latter is mounted on an angular bracket supported from upright bars at the rear end of the frame and has its output shaft 26$^b$ extending upwardly and rearwardly at a 45° angle as seen in Fig. 1. The input shaft 23 extends entirely through the casing of the speed reducer.

The shrimps are fed one at a time with their backs down and either of its ends first down a chute 25 toward a cutter blade 26 which projects to a slight extent between two horizontally opposed gripping and conveying rolls 27 and 28. The chute or trough 25 is U-shaped in cross section or V-shaped with a slightly rounded bottom as seen in Fig. 3; and it is inclined downwardly and rearwardly at an angle of about 45°. It is preferably reduced in width gradually from its upper end which is disposed at the cross bar 17 and may be attached thereto. The bottom of the chute is also fixed to the top of a sheet metal plate 29 which is fastened to and spans the tops of the inclined bars 18, 18'. The lower ends of the diverging sides of the chute are beveled and terminate close to the rolls as seen in Fig. 1. The plate 29 is disposed immediately beneath the rolls 27 and 28 to serve as a gage and it extends past the rolls to direct the treated shrimps into a suitable container or receptacle (not shown) located in the lower part of the frame 10.

The cutter, when it is in the form of a stationary blade such as shown at 26$^a$ in Fig. 6, may be fixed to the plate 29ª but when it is in the form of a rotary disk with a smooth peripheral edge or a circular saw, the plate is formed with a slot 30 through which the rotary cutter projects. The rotary blade 26 is fixed to one end of a shaft 31 mounted in a bearing 32 on the bar 18'. This shaft may be driven at the speed of the motor 21 by a suitable belt 33 which passes around pulleys 34 and 35 of the same size, one being fixed to the shaft 31 and the other to the projecting end of the shaft 23 as seen in Fig. 2.

Coacting with rolls 27 and 28 is an upper roll 38 disposed immediately above them and having its axis at right angles to the parallel axes of the rolls 27 and 28, the axes of all three rolls being in the same plane. All three of these cylindrical shaped rolls or rollers are made of sponge rubber or some equivalent resilient or elastic and spongy or cellular material. All three are positively driven at the same speed and are preferably of the same diameter, about 4", but the periphery of the upper roll is wider. The width of the peripheries of the rolls 27 and 28 is less than the height from top to bottom of a small size shrimp and the spacing of the periphery of the top roll 38 from the gage plate 29, or the bottom faces of lower rolls, is also less than the height or thickness from the top of the back to the bottom of the body of a small size shrimp, so that a shrimp of any size when it is drawn between the three rotating rolls will cause their peripheral portions to be deformed, as will be understood upon references to Figs. 4, 5 and 6. The shrimp will thus be centered and firmly but yieldably gripped as it is conveyed across the cutting device 26 or 26ª. The latter is centered between the rolls 27 and 28 and projects approximately ⅛" into the space between them. It will be noted that the peripheral portions of the rolls 27 and 28 will be deformed more or less according to the size of the shrimp between them, and that they will yieldably grip the opposite sides of the shrimp body adjacent its back which, as above noted, is lowermost as the shrimp slides down the chute and is picked up by the rolls. It will also be noted that the top roll 38 will exert a yieldable downward pressure because of the deformation of its peripheral portion and will press the shrimp downwardly between the rolls 27 and 28 and against the flat top of the plate 29. The action of the rolls shown in Fig. 6 is the same as above described and they convey the shrimp along and across the stationary blade 26ª projecting above the plate 29ª. The blade 26ª is flat and has a curved or arcuate upper edge which does the cutting as will be understood upon reference to Fig. 7.

The cylindrical rolls 27 and 28 are fixed to parallel shafts 39 and 40 respectively disposed at right angles to the plate 29 and through which they project. The lower ends of these shafts are journaled in bearings 41, 41' fixed to the opposed vertically disposed flanges of the angle bars 18' and 18 respectively, and their upper portions are journaled in bearings 42, 42' fixed to the under side of one of the flanges of the angle bar 16, as seen in Fig. 1. The shaft 39 is extended through an opening in the other flange of that cross bar and has fixed to it a pulley 43 for a suitable belt 44 which also pass around a pulley 45 fixed to the shaft 26ᵇ of the speed reducer. A pair of equal size meshing gears 46 fixed to the two shafts, transmits the motion of shaft 39 to shaft 40. The rolls 27 and 28 will thus be driven at the same speed, about 97 R. P. M. The upper roll 38 is fixed to a short horizontal shaft 47 journaled in a forked bracket 48 fastened to an upright arm 49 rising from the horizontal portion 19 of the bar 18, as seen in Fig. 1. A pair of equal size meshing beveled gears 50, one fixed to the shaft 40 and the other to the shaft 47, causes the roll 38 to be driven at the same speed as the rolls 27 and 28.

Due to the downward inclination of the chute 25 and its size and shape the shrimp, when dropped into the upper portion of the chute with its back down and either end foremost, will gravitate down to the rolls, but if desired a stream of water may be discharged into the top portion of the chute to facilitate the downward sliding movement. A water nozzle or outlet 51 is shown at the center of the top of the chute and is connected to a supply pipe or hose 52. A suitable cut-off and control valve (not shown) for the water line 52 may be provided on the frame 10 within reach of the operator who stands at the front end of the machine and drops the shrimps in rapid succession into the chute. Since the cross sectional area of the space bounded by the rolls 27, 28 and 38 and the plate 29, is less than the cross sectional area of a small size shrimp, and since these rolls are of resilient sponge rubber, all sizes of shrimps may be deveined without adjusting any of the parts relative to each other. Also because of the yieldability of the deformable rolls the machine will devein peeled or shelled shrimps, the opposed rolls 27 and 28 will yieldably grip the thicker end of the body of the shrimp and almost simultaneously the top roll 38 will yieldably press the body downwardly so that the shrimp will be centered as it is conveyed by the rolls over the cutting blade. Hence the cut will be through the center of the top or back of the shrimp. The rolls 27 and 28 exert the same pressure on opposite sides of the shrimp along the portions of the latter adjacent the back, while the yieldable downward pressure of the top roll keeps an advancing portion of the longitudinally curved back of the shrimp pressed down to the plate 29 as the shrimp is carried along the cutter blade. The latter will therefore make a cut substantially from end to end of the back of the shrimp body through the shell and into the body meat as shown in Fig. 4 or into the body meat of the peeled shrimp as shown in Fig. 6.

The operation of the machine has been explained in the above detailed description of the structure; and it is believed that it will be apparent that the machine is not only extremely simple but highly effective.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

I claim:

1. In a shrimp deveining machine, a chute of substantially U-shape in cross section disposed in a downwardly inclined position and down which a shrimp may slide by gravity with its back down and its length extending endwise of the chute, a flat gage at the lower end of the chute, a pair of opposed rolls positioned above said gage and rotatable on parallel axes substantially perpendicular to said gage, said rolls being formed of deformable resilient material and having their peripheral portions spaced to receive and grip the sides of a shrimp adjacent its back, a cutter blade disposed to project above said gage and centered in the space between the peripheries of said opposed rolls, an upper roll disposed opposite the space between said opposed rolls and rotatable on an axis at right angles to the axis of said opposed rolls, said upper roll being formed of deformable resilient material to yieldably press the shrimp downwardly between said opposed rolls to maintain the back of the shrimp in contact with said gage as the rolls convey the shrimp across said cutter blade, and means for driving said rolls at substantially the same speed.

2. The structure of claim 1 together with means for supplying water to the chute to facilitate the downward sliding of the shrimp, said means including a nozzle at the upper end of the chute and a water supply for said nozzle.

3. The structure of claim 1 in which said gage is a flat plate and said cutter blade is stationary and supported by the gage plate.

4. The structure of claim 1 in which said gage is a flat plate formed with a slot disposed in the plane of the bottom of said chute, and said cutter blade is circular and mounted for rotation with a portion of its periphery projecting through said slot, and means for rotating said cutter blade.

5. The structure of claim 1 in which all three of said rolls are cylindrical and have the same diameter.

6. A shrimp deveining machine comprising an upright supporting frame including at its top horizontally spaced front and rear cross bars, a pair of downwardly inclined bars in said frame spaced apart horizontally and inclined rearwardly from said front cross bar, an inclined gage plate supported on said inclined bars, a chute of substantially U-shape in cross section extending downwardly and rearwardly from said front cross bar to said plate, a pair of downwardly and forwardly inclined parallel shafts mounted in bearings on said rear cross bar and on said inclined bars, a pair of resilient sponge rolls fixed to said shafts and disposed in opposed and spaced relation over said plate at the lower end of said chute, a cutter blade centered in the space between said opposed rolls and projecting above said plate in the vertical plane of the bottom of said chute, meshing gears of equal size fixed to the upper portions of said parallel shafts, a short horizontal shaft disposed between and in the plane of said parallel shafts, means mounting said short shaft for rotation, meshing beveled gears of equal size, one being fixed to said short shaft and the other to one of said parallel shafts, and means for driving one of said parallel shafts.

7. The structure of claim 6 in which said cutter blade is stationary and is fixed to said plate.

8. The structure of claim 6 in which said plate has a slot centered in the space between the peripheries of said pair of rolls, and in which said cutter blade is circular and mounted for rotation with a portion of its periphery extending through said slot, and means for rotating said cutter blade.

ELBERT F. GREINER.

References Cited in the file of this patent

UNITED STATES PATENTS

| Number | Name | Date |
|---|---|---|
| 2,147,633 | Bottker | Feb. 21, 1939 |
| 2,263,696 | Grayson | Nov. 25, 1941 |
| 2,344,711 | McNutt et al. | Mar. 21, 1944 |
| 2,552,985 | Leuschner | May 15, 1951 |
| 2,644,980 | McKinstry | July 14, 1953 |